United States Patent [19]

Lenz

[11] Patent Number: 5,025,905
[45] Date of Patent: Jun. 25, 1991

[54] HAND CONTROL

[75] Inventor: Craig R. Lenz, Regina, Canada

[73] Assignee: Contact Technologies Inc., Weyburn, Canada

[21] Appl. No.: 437,158

[22] Filed: Nov. 16, 1989

[30] Foreign Application Priority Data

Sep. 6, 1989 [CA] Canada .................. 610435

[51] Int. Cl.⁵ .................. G05G 11/00; B60K 41/20
[52] U.S. Cl. .................. 192/1.52; 74/481; 74/522
[58] Field of Search .................. 74/481, 482, 522; 192/1.3, 1.36, 1.52

[56] References Cited

U.S. PATENT DOCUMENTS

| | | | |
|---|---|---|---|
| 2,033,756 | 3/1936 | Colgion | 74/522 |
| 2,648,996 | 8/1953 | MacDougall | 74/522 X |
| 2,777,335 | 1/1957 | Engberg et al. | 74/481 |
| 2,855,797 | 10/1958 | Dunn | 192/1.52 X |
| 3,373,628 | 3/1968 | Lake et al. | 74/484 |
| 3,442,149 | 5/1969 | Schwendenmann | 74/481 |
| 3,472,094 | 10/1969 | Lake et al. | 74/481 |
| 4,424,723 | 1/1984 | Gockel | 74/482 |
| 4,438,835 | 3/1984 | Dowden et al. | 192/3 M |
| 4,476,954 | 10/1984 | Johnson et al. | 180/333 |
| 4,788,879 | 12/1988 | Ulrich | 192/1.52 X |

FOREIGN PATENT DOCUMENTS

1005731 2/1977 Canada .
0069090 1/1983 European Pat. Off. .
1539880 2/1979 United Kingdom .

Primary Examiner—Allan D. Herrmann
Assistant Examiner—David W. Laub
Attorney, Agent, or Firm—Rogers, Bereskin & Parr

[57] ABSTRACT

A hand control device for operating the accelerator and brake of a motor vehicle includes brake and accelerator control rods for extending from the respective accelerator and brake pedals of a motor vehicle to below the vehicle steering wheel. Clamps connected to one end of each control rod secure the control rods to respective accelerator and brake pedals or pedal stalks and a handle member is pivotally connected to the other end of each control rod. Rotation of the handle member in a first direction, and with the connection between the handle member and the accelerator control rode acting as a fulcrum, causes longitudinal movement of the brake control rod, depression of the brake pedal, and operation of the brake. Rotation of the handle in a second direction, opposite to the first direction, and with the connection between the handle member and the brake control rod acting as a fulcrum, causes longitudinal movement of the accelerator control rod, depression of the accelerator pedal, and operation of the accelerator.

22 Claims, 4 Drawing Sheets

HAND CONTROL

FIELD OF THE INVENTION

This invention relates to a hand control device for operating the accelerator and brake controls of a motor vehicle, and in particular to a portable hand control device.

BACKGROUND OF THE INVENTION

Conventional motor vehicles incorporate foot controls, a typical motor vehicle with an automatic gearbox having accelerator and brake pedals. To permit operation by disabled persons having restricted or no use of their legs, such vehicles may be fitted with hand controls which permit hand operation of the accelerator and brake pedals.

Only a small number of cars specially adapted for disabled drivers have been produced, the majority of drivers using conventional vehicles which have been fitted with hand controls as described above.

Various proposals for such devices are disclosed in the below listed patents and patent application:
U.S. Pat. No. 3,373,628 to L. Lake et al
U.S. Pat. No. 3,442,149 to F. S. Schwendenmann
U.S. Pat. No. 3,472,094 to L. Lake et al
U.S. Pat. No. 4,424,723 to D. A. Gockel
U.S. Pat. No. 4,438,835 to Dowden, deceased et al
U.S. Pat. No. 4,476,954 to Johnson et al.
Canadian Patent No. 1,005,731 to T. Mitro
European Patent Application 0069 090 to G. Venturini
U.K. Patent No. 1,539,880 to E. Aston From the disclosures contained in these patents and patent application, it is evident that a wide variety of devices has been contemplated. In U.S. Pat. No. 4,476,954 to Johnson et al an electrically actuated control provides for one-handed operation of a motor vehicle through use of a two-axis joystick. The joystick controls a pair of linear actuators and a rotary actuator powered by an electric motor to effect throttle, brake and steering control.

The majority of previously disclosed hand controls are however manually operated and provide direct mechanical links between control handles and levers and the accelerater and brake pedals or controls. In U.S. Pat. No. 3,373,628 to Lake et al, control of a vehicle is achieved by rotation of a steering column mounted handle about an axis parallel to the column, the rotational movement being transferred through a bevel gearbox to cause rotation of a lever, the ends of which are pivotally attached to control rods connected to the accelerator and brake control. In a second embodiment, a steering column mounted handle is rotated about a fulcrum with an axis perpendicular to the column to operate a push rod connected to a lever pivotally mounted further down the steering column. The ends of the lever are pivotally attached to control rods connected to the accelerator and brake pedals.

In U.S. Pat. No. 3,442,149 to Schwendenmann a firewall mounted operating handle is used to operate the brake control by pushing downwardly on the handle and transferring movement through a push rod to the brake pedal, while rotating the handle about a lateral axis operates a system of gears and cranks to depress the accelerator pedal In U.S. Pat. No. 3,472,094 to Lake et al a steering column mounted, twin handle control is disclosed. The brake pedal of a vehicle fitted with the control is operated by a handle which is pushed downwardly towards the pedals and the accelerator pedal is operated by a second handle which is rotatable about an axis parallel to the steering column.

In U.S. Pat. No. 4,438,835 to Dowden et al a control is disclosed which utilizes push-pull control rods, one for each of the accelerator and brake pedals, the rods being mounted on a support frame secured to the vehicle floor.

In U.K. Patent No. 1,539,880 to Aston, a single handle, steering column mounted control mechanism is disclosed. Rotation of the handle in a plane parallel with the steering wheel operates a Bowden cable linkage to control the accelerator, while movement of the handle in a downward direction parallel to the steering column causes movement of a push rod to operate the brake pedal.

In Canadian Patent No. 1,005,731 to Mitro, a handle in the form of a lever is pivotally attached about a steering column mounting. Push rods extending from the accelerator and brake pedals are pivotally connected to the handle on either side of the mounting, rotation of the handle in one direction resulting in operation of the accelerator pedal, and rotation of the handle in the opposite direction resulting in operation of the brake pedal.

In European Patent Application No. 0 069 090 to Venturini, a hand operated accelerator control is disclosed. The accelerator pedal of a vehicle is connected to a lever system which is attached to a movable sheath which forms the cover of a steering wheel. Twisting the sheath operates levers and push rods to operate the accelerator pedal.

The controls disclosed in the above discussed patents and patent application are connected to the accelerator and brake controls of a vehicle and are also rigidly connected to a fixed point on the vehicle. In the Johnson et al, Lake et al, Aston, Venturini and Mitro disclosures, the devices are adapted for fixing to the steering column of a vehicle. The control disclosed in Schwendenmann is fixed to the firewall of a vehicle, while the Dowden control is fixed to the vehicle floor. Such methods of mounting are preferable for a hand control which is to be used over an extended period, but are inconvenient when a hand control is only desired to be used for a short time. In particular, such mounting will often require extensive and expensive modification to be made to a vehicle to permit the provision of a secure mounting, particularly in modern vehicles, where the steering column is often shrouded in plastic mouldings containing switches, steering locks and other fittings. Due to these difficulties, disabled drivers are often denied access to vehicles, for example for test drives prior to a vehicle purchase, or for renting.

This problem has been appreciated to some extent, and U.S. Pat. No. 4,424,723 to Gockel discloses portable hand control apparatus in which the handle and control rods forming part of the apparatus are free of any operative connection to the motor vehicle, apart from foot pedal clamps. The control rods are pivotally mounted to the foot pedal clamps. The brake control rod is rigidly attached to a brake control handle which slidably receives an end of the accelerator control rod which is provided with a knob element for thumb operation. In use, it would seem most likely that the control rods or handle rests on the operator's knees or lap, or is supported in a raised position by the operator. This would be likely to increase the effort required to operate the vehicle.

SUMMARY OF THE INVENTION

According to the present invention there is provided a hand control device for operating the accelerator and brake controls of a motor vehicle comprising a brake control member and an accelerator control member, mounting means connected to one end of each control member for securing the members to a respective control, and a handle member pivotally connected to the other end of each control member. Rotation of the handle member in a first direction, with the connection between the handle member and the accelerator control member acting as a fulcrum, operates the brake control. Rotation of the handle member in the second direction opposite to said first direction, with the connection between the handle member and the brake control member acting as a fulcrum, operates the accelerator control.

Preferably, the handle member is pivotally connected to the accelerator control member at one end portion, pivotally connected to the brake control member at an intermediate portion, and provided with an operator grip at the other end portion, whereby pushing the grip towards the controls operates the brake control and pulling the grip away from the controls operates the accelerator controls.

A flexible member may be provided and extend from the connection between the handle member and the accelerator control member to the firewall of the motor vehicle, the length of the flexible member being such that the member is placed under tension when the brake control is being operated and the tension which would otherwise be applied to the accelerator control is at least reduced.

According to a further aspect of the present invention there is provided a hand control device for operating the accelerator and brake control of a motor vehicle comprising first and second control members, one for operating the brake control and the other for operating the accelerator control. First mounting means are connected to one end of the first control member for mounting the control member to the respective control, and are adapted to prevent at least downward rotation of the member relative to the control. Second mounting means are connected to one end of the second control member for securing the member to the respective other control. A handle member is pivotally connected to the other end of each control member. Rotation of the handle member in a first direction operates the brake control, while rotation of the handle member in a second direction, opposite to the first direction, operates the accelerator control. The weight of the device is supported by the respective control.

Preferably, the first mounting means is adjustable to vary the relative positioning of the respective control and the first control member, to allow variation in the positioning of the handle member, which will typically be positioned between the vehicle steering wheel and the lap of the vehicle operator.

BRIEF DESCRIPTION OF THE DRAWINGS

A preferred embodiment of the present invention will now be described, by way of example, with reference to the accompanying drawings in which.

DETAILED DESCRIPTION OF PREFERRED EMBODIMENT

Figure 1:
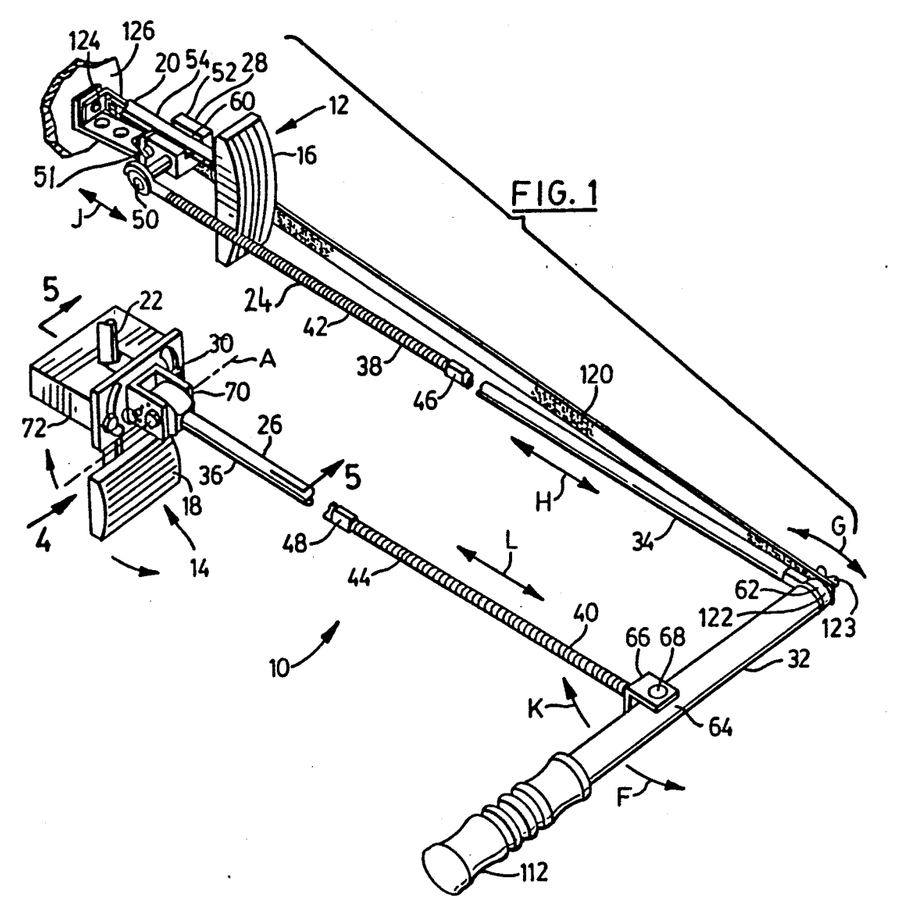
FIG. 1 is a perspective view of a hand control device for operating the accelerator and brake controls of a motor vehicle, in accordance with a preferred embodiment of the present invention, and showing portions of the accelerator and brake controls of a motor vehicle.

Reference is first made to FIG. 1 of the drawings, which illustrates a hand control device 10 fitted to the accelerator and brake controls 12 and 14 of a motor vehicle. This device is primarily intended for use with vehicles provided with an automatic gearbox, such that only two foot operated controls are provided. Each control 12 and 14 comprises a pedal 16 and 18 mounted on a stalk 20 and 22. It should be noted that the particular configuration of control illustrated is intended to be merely exemplary, and that the device 10 can be readily fitted to vehicle with different control configurations.

As will be described, the device 10 includes accelerator and brake control rods 24 and 26, mounting clamps 28 and 30 connected to one end of a respective control rod 24 and 26 for securing the rod to a control 12 and 14, and a handle member 32 pivotally connected to the other end of each control rod 24 and 26.

Each control rod 24 and 26 is formed of two elongate parts, a tubular, female part 34 and 36 having an internal screw thread provided therein, and a smaller diameter, male part 38 and 40 provided with an external screw thread 42 and 44 for cooperating with the internal screw thread of the female part 34 and 36. Thus, relative rotation of the connected parts 34 and 38, and 36 and 40, causes relative telescoping movement between the parts and changes the length of the control rod 24 and 26. A lock nut 46 and 48 is provided on each male part 38 and 40 to secure the relative positions of the parts 34 and 38, and 36 and 40.

The male part 38 of the accelerator control rod 24 is provided with a ball joint 50 at a lower end portion for connection with the accelerator mounting clamp 28. The clamp 28 comprises a rectangular block 52 having a channel 54 provided therein for receiving the accelerator stalk 20. At least one clamping screw 51 is located in a threaded bore provided in the block 52 and may be adjusted to firmly clamp the stalk 20 against an opposing face 60 of the channel 54. The channel side wall 60 is provided with a recessed portion to locate and centre the stalk 20 in the channel 54.

The other end of the accelerator control rod 24, at the end of the female part 34, is connected to one end of the handle member 32 through a further ball joint connection 62.

Figure 3:
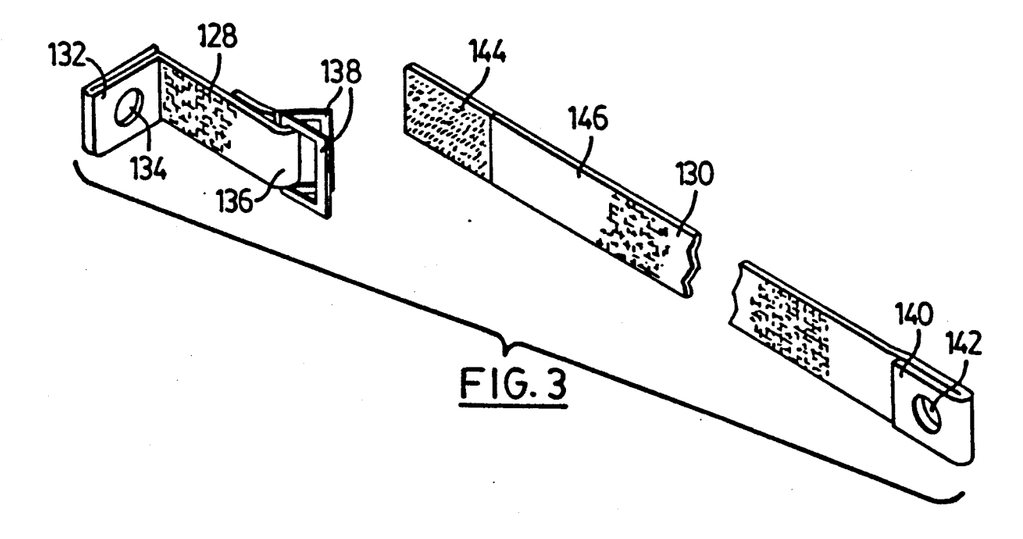
FIG. 3 is an enlarged view of the retention strap of the device of FIG. 1, showing the elements of the strap separated.

Mounted parallel to the accelerator control rod 24 is a flexible member, in the form of an adjustable, inextensible retention strap 120, one end of which is attached to a bolt 122 extending from the ball joint connection 62, and secured by a wing-nut 123. The other end of the strap 120 is mounted on a secure bolt 124 on the vehicle firewall 126. FIG. 3 of the drawings illustrates the elements of the strap 120 a shorter strap 128 for mounting on the firewall 126; and a longer strap 130 for mounting on the ball joint connection 62.

The shorter strap 128 has a doubled over end 132 provided with a grommet 134 for receiving the bolt 124. The other end 136 is doubled over to form a loop which accomodates two D-rings 138. Typically, the strap 128 will be about 6" long.

The longer strap 130 features a doubled over end 140 provided with a grommet 142 for receiving the bolt 122 extending from the connection 62. The other end of the strap 130 is provided with a short length of hook surface tape 144, while the intermediate portion of the strap 130 is provided with a length of loop surface tape 146. Preferably, the hook and loop tapes 144, 146 are formed of VELCRO (Trade Mark). Typically, the strap 130 is about 36" long, the hook surface tape 144 being about 3" long, and the loop surface tape 146 about 31" long. The straps 128 and 130 may be formed of any suitable material, and in this example are formed of high tension nylon.

When mounting the strap 120, the longer strap 130 is attached to the shorter strap 129 using the D-rings 138. The length of the strap 120 is adjusted such that when the brake is applied, using the device 10, as will be described hereinafter, there is no tension on the throttle mechanism. The loose end of the strap 130 is then folded back and secured to an intermediate portion of the strap 130 using the hook and loop tape.

Figure 2:
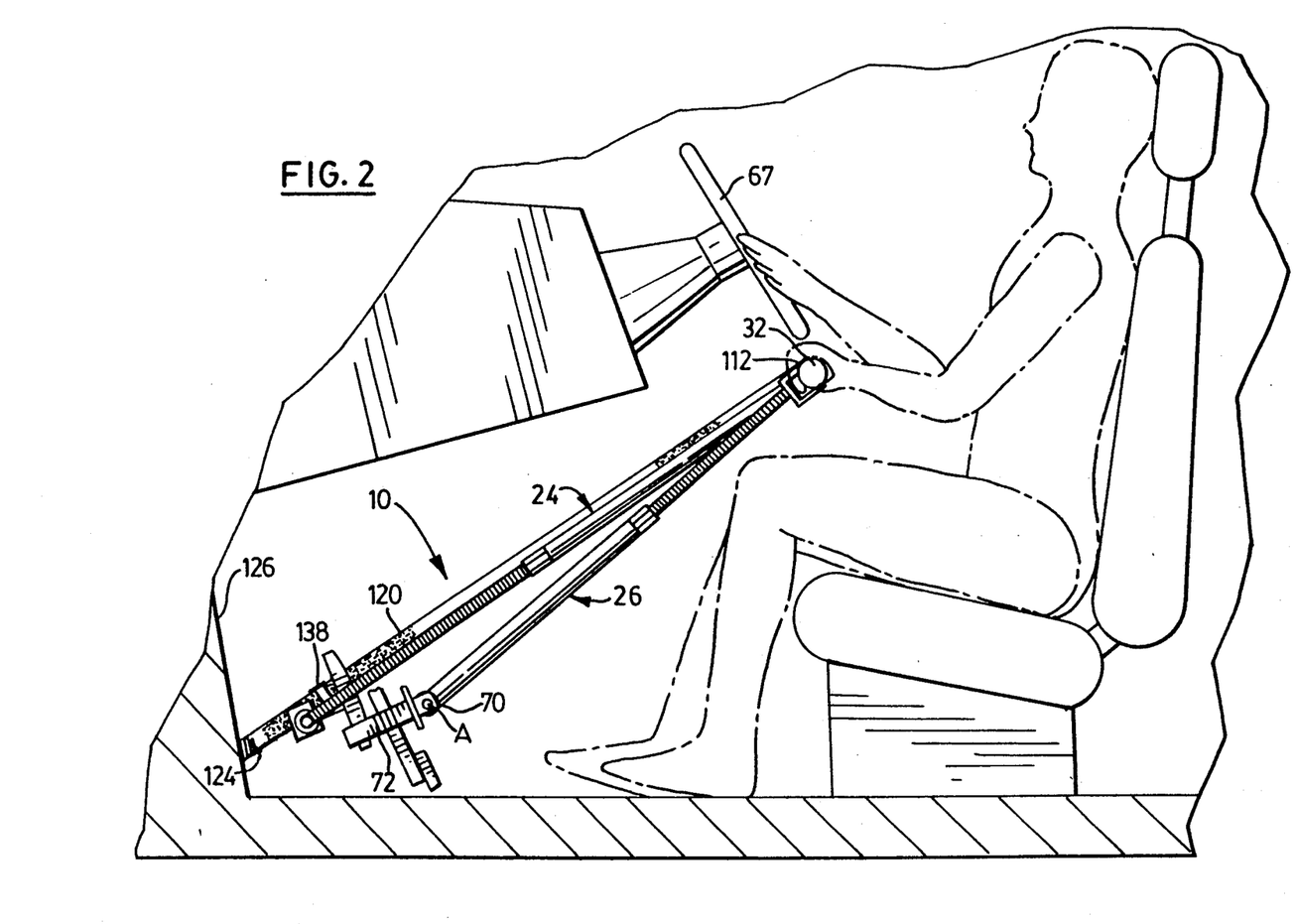
FIG. 2 is a side view of the device of FIG. 1 and fitted in a vehicle including a representation of a vehicle operator using the device to operate the vehicle.

The brake control rod 26 is connected, at its other end, to an intermediate portion of the handle member 32 through a pivot joint 64. A clevis 66 fixed to the end of the male part 40 of the rod 26 includes a pivot pin 68 which extends through a corresponding aperture in the handle member 32. In the illustrated example, the pin 68 and aperture are substantially parallel to the plane of the vehicle steering wheel 67 (FIG. 2).

The one end of the brake control rod 26 is fixed to the brake stalk 22 by the brake mounting clamp 30, which includes setting means for setting the angle of the rod 26 relative to the stalk 22, the setting means including first and second mounting portions 70 and 72.

Figure 4:
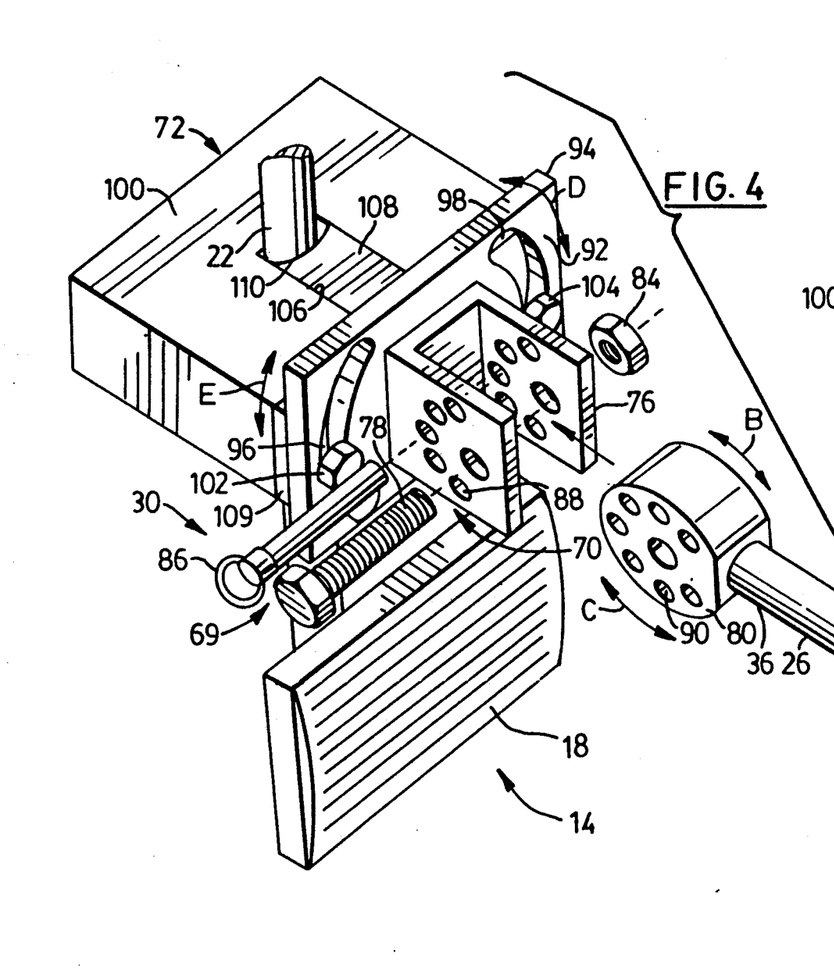
FIG. 4 is a partially exploded and enlarged scrap view in the direction 4 of FIG. 1.
Figure 5:
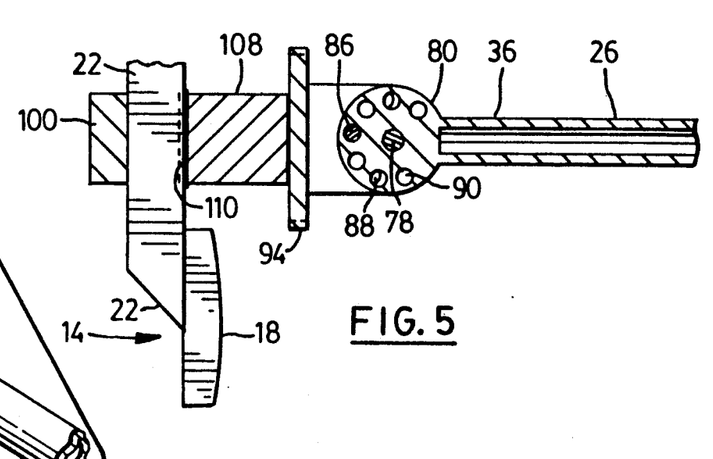
FIG. 5 is an enlarged sectional view on line 5—5 of FIG. 1.

The first mounting portion 70 serves to pivotally mount the brake control rod 26 on the brake control 14 about a substantially horizontal axis A and thus maintain the rod 26, and the device 10, in a convenient and comfortable position for operation of the accelerator and brake controls of a vehicle. FIG. 2 of the drawings illustrates typical positioning of the device. Details of the brake mounting clamp 30 are shown in FIGS. 4 and 5 of the drawings, to which reference is now also made. The first mounting portion 70 including locking means for locking the control rod 26 relative to the first mounting portion 70. The first mounting portion 70 comprises a clevis 76 for receiving the one end of the control rod 26 and a pivot pin 78 extending through the clevis. The pin 78 also extends through the end of the control rod 26, which is in the form of a disk-shaped portion 80 and fits snugly within the clevis 76 The pivot pin 78 is in the form of a bolt, held in place by means of a locking nut and lock washer 84. The locking means is in the form of a pin 86 which is located in one of a plurality of, in this example five, apertures 88 provided in the clevis and passes through one of a plurality of, in this example seven, radially spaced apertures 90 in the end portion 80. Conveniently, the apertures 88 and 90 are spaced at 35° and 40° intervals, respectively. The pin 86 may be provided with a spring loaded ball to ensure the pin 86 is retained in the apertures 88 and 90, or alternatively may be replaced by, for example, a bolt fastener.

The clevis 76 is fixed to a front face 92 of a plate 94 provided with part-circumferential apertures 96 and 98. The plate 94 is secured to a block 100 mounted to the brake stalk 22 by means of fasteners, in the form of bolts provided with flat and lock washers 102 and 104 which pass through the apertures 96 and 98 to engage in threaded bores provided in a front face of the block 100, which forms part of the second mounting portion 72. The block 100 is provided with a rectangular channel 106 in the front face thereof, which receives a portion of the brake stalk 22 The stalk is retained in the channel 106 by a wedge block 108 on the rear face of a plate 109 held between the plate 94 and the front face of the block 100 The block 108 has a recessed engaging surface 110 to locate and centre the block 108, and thus the brake mounting clamp 30, relative to the stalk 22. The plate 109 lies flush with the block 100 and is provided with bores to accomodate the bolts 102 and 104.

The brake mounting clamp 30 thus may be used to rigidly attach the brake control rod 26 to the brake stalk 22 and thus position the handle member 32 relative the driver and the other vehicle operating controls.

The free end of the handle member 32 is provided with a foam, rubber or plastic grip 112 which, as may be seen in FIG. 2, is held by the vehicle operator, in this example in the left hand.

To raise or lower the handle member 32 to a more comfortable or convenient position the locking pin 86 is removed from the apertures 88 and 90, and the brake control rod 26 rotated on the push pin 78, in direction B or C (FIG. 4), until the handle member 32 is at the desired height. The pin 86 is then passed through an aligned set of apertures 88 and 90 to lock the rod 26 relative to the clamp 30, and the stalk 22.

To accommodate an angled stalk 22, the bolts 102 and 104 are loosened to permit limited rotation of the plate 94 relative to the block 100 and plate 109, in direction D or E (FIG. 4), to maintain the plate 94 in a substantially upright orientation and thus the handle member in a substantially horizontal orientation. Different configurations of accelerator stalks 20 and differences in the relative locations in the accelerator and brake stalks 20 and 22 are accomodated by the ball joints 50 and 62 and by adjusting the lengths of the rods 24 and 26.

The provision of the length adjustable control rods 24 and 26 and retaining strap 130, and the adjustable mounting clamps 28 and 30 which can accomodate pedal stalks of various configurations and orientations, allows a single hand control device 10 to be used on a wide variety of vehicles by persons of varying stature.

Conveniently, the blocks 52 and 100 are of extruded 6063 alloy temper T-5, the female parts 34 and 36 of the control rods 24 and 26 of electric welded 0.750×0.49 chromolly tubing and the remainder of the device of steel. The steel parts may be chrome plated or powder coated and the handle may be formed of 0.875×0.049 chromolly.

In use, to operate the accelerator control 12, the operator pulls on the grip 112 which, once the brake stalk 22 has been pulled to its forward limit of movement, rotates the handle about the pivot pin 68, in direction F (FIG. 1) causing the opposite end of the handle member 32 to move in an arc G towards the accelerator control and the accelerator control rod 24 to be moved longitudinally (arrow H) and thus the accelerator pedal 16 depressed (arrow J). To slow the vehicle, the operator pushes the grip 112 towards the controls, in direction K. The handle member 32 will rotate about the pivot pin 68, in the opposite direction, to move the end of the handle member 32 away from the control 12 until the accelerator control is pulled to the idle position and the accelerator stalk 20 has been pulled to its forward limit of movement, the strap 120 restraining further movement of the stalk 20. The strap ensures that a firm braking force can be applied without the application of tension to the accelerator mechanism. At this point, the handle member 32 begins to rotate about the ball joint 62 causing movement of the intermediate portion of the handle member towards the brake control 14. This causes longitudinal movement of the brake control rod 26 (arrow L) such that the brake pedal is depressed and the vehicle brakes applied. It will be noted that while one of the controls is being operated, the pivot point between the handle member 30 and the other control rod acts as a fulcrum for the rotation of the handle member 32, such that no further pivot points are required.

Thus, it will be seen that the hand control device 10 described above provides a portable means for converting conventional motor vehicles to hand control without requiring any modifications to be made to the vehicle, such that a disabled person possessing a single device 10 may readily operate rented conventional vehicles or test drive conventional vehicles before selection of a vehicle for fitting with a permanent hand control device. Similarly, vehicle rental agencies or vehicle dealers may provide devices for use on vehicles required for test driving or renting by disabled drivers.

The use of a rigid, easily dismountable clamping arrangement allows the device to be quickly and easily fitted to a vehicle, and once fitted, provides a secure mounting for the device. The fixed height of the handle member decreases driver effort and fatigue, and combined with the simple push-pull lever operation allows operation of the brake and accelerator pedals with minimal exertion. Further, entry and exit from the vehicle is not substantially impaired by the device 10, as the mounting holds the rods 24 and 26 and handle member 32 clear of the vehicle seat. Also, the configuration of the clamps 28 and 30 allows for normal use of the vehicle while still fitted with the device.

To ease portability, the device 10 may be easily and quickly dismantled and the parts stored in a carrying case no bigger than a typical briefcase.

It will of course be clear to those skilled in the art that the embodiment described above is merely exemplary, and that various modifications and improvements may be made within the scope of the invention. The device 10 illustrated above with the rigid mounting provided on the brake control, and a strap for limiting movement of the accelerator contol. This is due to the generally heavier construction of brake stalks being better adapted to support the weight of the device 10. In certain vehicles it may be that the strap 120 is not required or that the device 10 can be more easily rigidly attached to the accelerator control.

Further, the embodiment described above has been shown with straight control rods. For certain vehicles it may be necessary to provide curved or angled control rods to accomodate, for example, different console and dashboard configurations, or different pedal configurations or locations.

I claim:
1. A hand control device for operating the accelerator and brake controls of a motor vehicle comprising:
   a brake control member and an accelerator control member;
   mounting means connected to one end of each control member for securing said members to a respective control; and
   a handle member pivotally connected to the other end of each control member, rotation of the handle member in a first direction, with the connection between the handle member and the accelerator control member acting as a fulcrum, operating the brake control, and rotation of the handle member in a second direction opposite to said first direction, with the connection between the handle member and the brake control member acting as a fulcrum, operating the accelerator control.

2. A hand control device for operating the accelerator and brake controls of a motor vehicle comprising:
   first and second control members, one for operating the brake control and the other for operating the accelerator control;
   first mounting means connected to one end of the first control member for fixing said first control member to a respective control and including setting means for setting the angle of the first control member relative to said control;
   second mounting means connected to one end of the second control member for securing said second control member to the respective other control; and
   a handle member pivotally connected to the other end of each control member,
   rotation of the handle member in a first direction operating the brake control, and rotation of the handle member in a second direction opposite to said first direction operating the accelerator control, the weight of the device being supported by said respective control.

3. A hand control device for operating the accelerator and brake controls of a motor vehicle, comprising:
   first and second control members, one for operating the brake control and the other for operating the accelerator control;
   first mounting means for rigidly connecting one end of the first control member to a respective control;
   second mounting means for connecting to one end of the second control member for mounting said second control member to the respective other control; and
   a handle member pivotally connected to the other end of each control member;
   rotation of the handle member in a first direction, with the connection between the handle member and the accelerator control member acting as a fulcrum, operating the brake control, and rotation of the handle member in a second direction, opposite to said first direction, with the connection between the handle member and the brake control member acting as a fulcrum, operating the accelerator control, the weight of the device being supported by said respective control.

4. The hand control device of claim 1, 2 or 3, wherein the handle member is pivotally connected to one of the control members at one end portion, pivotally connected to the other control member at an intermediate portion and provided with an operator grip at the other end portion.

5. The hand control of claim 1, 2 or 3, wherein the lengths of the control members are adjustable.

6. The hand control of claim 1, 2 or 3, wherein each control member is in two parts, an at least partially tubular female part and a male part, an end portion of the male part being received by the female part, locking means being provided for locking the parts in fixed relation and thus fixing the length of the respective control member.

7. The hand control of 1, 2 or 3, wherein a flexible member is provided at the accelerator mounting means for attachment to the vehicle and the limit movement of the accelerator control when the handle member is rotated in the first direction to operate the brake control.

8. The hand control device of claim 2, wherein the setting means includes a first mounting portion for pivotally mounting the said one of the control member about a substantially horizontal axis and including locking means for locking said control member relative to said first mounting portion.

9. The hand control device of claim 8, wherein the first mounting portion comprises a clevis for receiving one end portion of the control member and a pivot pin extending through the clevis and the end portion of the control member, the locking means comprising a locking pin radially spaced from the pivot pin location and passing through the clevis and the end portion of the control member.

10. The hand control device of claim 9, wherein at least one of the clevis and the end portion of the control member includes a plurality of locking pin receiving locations.

11. The hand control device of claim 8, wherein the setting means includes a second mounting portion for securing the first mounting means to the stalk of the respective control pedal.

12. The hand control device of claim 11, wherein the second mounting portion may be pivoted relative to the first mounting portion to accommodate different control configurations.

13. The hand control of claim 12, wherein the second mounting portion includes a block provided with a slot and a clamping member for securely retaining the stalk in the slot.

14. The hand control of claim 13 wherein the first mounting portion is provided with arcuate apertures for receiving fasteners for fixing the first mounting portion relative to said block and thus the second mounting portion.

15. The hand control of claim 12, wherein the second mounting portion includes a block provided with a slot for receiving the stalk of the respective control pedal and a clamping member for securely retaining the stalk in the slot.

16. The hand control of claim 15, wherein the first mounting portion is provided with circumferentially extending apertures for receiving fasteners for fixing the first mounting portion relative to said block of the second mounting portion, the arrangement of the apertures permitting rotation of the first mounting portion relative to the block and the stalk of the respective control pedal.

17. The hand control of claim 2, wherein said second control member is pivotally mounted to the second mounting means.

18. The hand control of claim 17, wherein said second control member is mounted to the second mounting means and the handle member via respective ball joints.

19. The hand control of claim 18, wherein said second mounting means includes clamping means for securing said second mounting means to a stalk of a control pedal of the respective other control.

20. A hand control device for operating the accelerator and brake controls of a motor vehicle comprising:
a brake control rod and an accelerator control rod for extending from respective accelerator and brake pedals of a motor vehicle to adjacent the vehicle steering wheel;
clamping means connected to one end of each control rod for securing said control rods to a respective control; and
a handle member pivotally connected to the other end of each control rod,
rotation of the handle member in a first direction, and with the connection between the handle member and the accelerator control rod acting as a fulcrum, causing longitudinal movement of said brake control rod, depression of the brake pedal, and operation of the brake control, and rotation of the handle control in a second direction opposite to said first direction, and with the connection between the handle member and the brake control rod acting as a fulcrum, causing longitudinal movement of said accelerator control rod, depression of the accelerator pedal, and operation of the accelerator control.

21. A hand control device for operating the accelerator and brake controls of a motor vehicle comprising:
a brake control rod and an accelerator control rod for extending from adjacent respective accelerator and brake pedals of a motor vehicle to below and adjacent the vehicle steering wheel;
brake mounting means connected to one end of the brake control rod for rigidly mounting said brake control rod to the brake control and including setting means for setting the angle of the brake control rod relative to the brake control;
accelerator mounting means connected to one end of the accelerator control rod for pivotally securing said accelerator control rod relative to the accelerator control; and
a handle member pivotally connected to the other end of each control rod,
rotation of the handle member in a first direction causing longitudinal movement of said brake control rod, depression of the brake pedal and operation of the brake control, and rotation of the handle member in a second direction, opposite to said first direction, causing longitudinal movement of said accelerator control rod depression of the accelerator pedal and operation of the accelerator control, the weight of the device being supported by the brake control.

22. A hand control device for operating the accelerator and brake controls of a motor vehicle comprising:
a brake control rod and an accelerator control rod for extending from respective accelerator and brake pedals of a motor vehicle to below and adjacent the vehicle steering wheel;
brake mounting means connected to one end of the brake control rod for rigidly mounting said brake control rod to the brake control;
accelerator mounting means connected to one end of the accelerator control rod for pivotally securing said accelerator control rod to the accelerator control; and a handle member pivotally connected to the other end of each control rod, rotation of the handle member in a first direction, with the connection between the handle member and the accelerator control rod acting as a fulcrum, causing longitudinal movement of said brake control rod, depression of the brake pedal and operation of the brake control, and rotation of the handle member in a second direction, opposite to said first direction, with the connection between the handle member and the brake control rod acting as a fulcrum, causing longitudinal movement of said accelerator control rod, and thus depression of the accelerator pedal and operation of the accelerator control, the weight of the device being supported by the brake control.

* * * * *